(12) United States Patent
Shelnut et al.

(10) Patent No.: US 7,024,093 B2
(45) Date of Patent: Apr. 4, 2006

(54) METHODS OF FORMING WAVEGUIDES AND WAVEGUIDES FORMED THEREFROM

(75) Inventors: James G. Shelnut, Northboro, MA (US); Matthew L. Moynihan, Sterling, MA (US); Omari Patterson, Woburn, MA (US)

(73) Assignee: Shipley Company, LLC, Marlborough, MA (US)

( * ) Notice: Subject to any disclaimer, the term of this patent is extended or adjusted under 35 U.S.C. 154(b) by 67 days.

(21) Appl. No.: 10/726,052

(22) Filed: Dec. 2, 2003

(65) Prior Publication Data

US 2004/0218889 A1 Nov. 4, 2004

Related U.S. Application Data

(63) Continuation-in-part of application No. 10/307,904, filed on Dec. 2, 2002, now Pat. No. 6,842,577.

(60) Provisional application No. 60/469,078, filed on May 8, 2003.

(51) Int. Cl.
*G02B 6/00* (2006.01)

(52) U.S. Cl. ............... 385/143; 385/141; 385/129; 430/321

(58) Field of Classification Search ........... 385/129, 385/141–145; 430/321; 156/244.12
See application file for complete search history.

(56) References Cited

U.S. PATENT DOCUMENTS

| 5,064,266 A | 11/1991 | Sun et al. |
|---|---|---|
| 5,200,487 A | 4/1993 | Lagarde et al. |
| 5,230,990 A | 7/1993 | Iwasaki et al. |
| 5,378,585 A | 1/1995 | Watanabe |
| 5,439,782 A | 8/1995 | Haemmerle et al. |
| 5,534,101 A * | 7/1996 | Keyworth et al. ..... 156/244.12 |
| 5,554,465 A | 9/1996 | Watanabe |
| 5,612,170 A | 3/1997 | Takemura et al. |
| 5,672,672 A | 9/1997 | Amano et al. |
| 5,761,364 A | 6/1998 | Knapp et al. |
| 5,846,694 A | 12/1998 | Strand et al. |
| 6,054,253 A | 4/2000 | Fardad et al. |
| 6,087,064 A | 7/2000 | Lin et al. |
| 6,088,492 A | 7/2000 | Kaneko et al. |
| 6,144,795 A | 11/2000 | Dawes et al. |
| 6,272,275 B1 | 8/2001 | Cortright et al. |

(Continued)

FOREIGN PATENT DOCUMENTS

EP 0 543 761 A1 5/1993

(Continued)

OTHER PUBLICATIONS

Syms et al., "Reflow and Burial of Channel Waveguides Formed in Sol-Gel Glass on Si-Substrates"; IEEE Photonics Technology Letters, vol. 5, No. 9, Sep. 1993, pp. 1077-1079.

(Continued)

*Primary Examiner*—Phan T. H. Palmer
(74) *Attorney, Agent, or Firm*—Jonathan D. Baskin

(57) ABSTRACT

Provided are methods of forming optical waveguides. The methods involve: (a) forming over a substrate a layer of a photodefinable composition; (b) exposing a portion of the layer to actinic radiation; (c) developing the exposed layer to form a waveguide core structure; and (d) heating the waveguide core structure to a temperature and for a time effective to reflow the structure such that it becomes at least partially rounded in cross-section. Also provided are optical waveguides formed from the described methods and electronic devices including one or more of the optical waveguides.

20 Claims, 7 Drawing Sheets

U.S. PATENT DOCUMENTS

| | | |
|---|---|---|
| 6,319,551 B1 | 11/2001 | Risen, Jr. et al. |
| 6,344,305 B1 | 2/2002 | Lin et al. |
| 6,731,857 B1 | 5/2004 | Shelnut et al. |
| 2001/0007732 A1 | 7/2001 | Iwasaki et al. |

FOREIGN PATENT DOCUMENTS

| | | |
|---|---|---|
| EP | 0 691 554 A1 | 1/1996 |
| EP | 0709434 | 5/1996 |
| EP | 1 037 073 A2 | 9/2000 |
| EP | 1 251 155 A | 10/2002 |
| GB | 2 346 452 | 8/2000 |
| JP | 57-168246 | 10/1982 |
| JP | 58-096654 | 6/1983 |
| JP | 63-279245 | 11/1988 |
| JP | 03-015805 | 1/1991 |
| JP | 04-271306 | 9/1992 |
| JP | 04-366958 | 12/1992 |
| JP | 1993-210020 A | 8/1993 |
| JP | 6-172533 | 6/1994 |
| JP | 06-172533 | 6/1994 |
| JP | 1994-174952 A | 6/1994 |
| JP | 1994-194533 A | 7/1994 |
| JP | 6-256523 | 9/1994 |
| JP | 8-259895 | 10/1996 |
| JP | 8-304644 | 11/1996 |
| JP | 8-327842 | 12/1996 |
| JP | 10-148729 | 6/1998 |
| JP | 10-253845 | 9/1998 |
| JP | 1999-326665 A | 11/1999 |
| JP | 2000-056148 A | 2/2000 |
| JP | 31 33039 | 11/2000 |
| JP | 2000-307090 A | 11/2000 |
| JP | 2001-042150 A | 2/2001 |
| JP | 2002-116335 A | 4/2002 |
| JP | 2002-202426 A | 7/2002 |
| JP | 2002-258085 A | 9/2002 |
| JP | 2003-3048984 A | 2/2003 |
| WO | WO 98/26315 | 6/1998 |

OTHER PUBLICATIONS

Sun et al., "Silica-Based Circular Cross-Sectioned Channel Waveguides"; IEEE Photonics Technology Letters, vol. 3, No. 3, Mar. 1991, pp. 238-240.

Bagley et al., "The Processing and Use of Organosilicon Polymers for Photonic Applications"; Polymer Engineering and Science, Mid-Sep. 1989, vol. 29, No. 17, pp. 1197-1199.

Brault et al., "Bilevel Polysiloxane Resist for Ion-Beam and Electron-Beam Lithography"; SPIE vol. 539 Advances in Resist Technology and Processing II (1985); pp. 70-73.

* cited by examiner

METHODS OF FORMING WAVEGUIDES AND WAVEGUIDES FORMED THEREFROM

CROSS-REFERENCE TO RELATED APPLICATIONS

This application is a continuation-in-part of U.S. application Ser. No. 10/307,904, filed Dec. 2, 2002, now U.S. Pat. No. 6,842,577, the entire contents of which are herein incorporated by reference. This application also claims the benefit under 35 U.S.C. §119(e) of Provisional Application No. 60/469,078, filed May 8, 2003, the entire contents of which are herein incorporated by reference.

BACKGROUND OF THE INVENTION

The present invention relates generally to the field of optical waveguides. In particular, the present invention relates to optical waveguides that are rounded in cross-section and to methods of forming such optical waveguides. In addition, the invention relates to electronic devices that include such optical waveguides and to methods of forming such electronic devices.

Light is becoming increasingly important in the transmission of data and communications. Fiber optic cables are replacing conventional electrical cables in a number of applications. For example, optical integrated circuits (OICs) are gaining importance for high bandwidth optical interconnects on printed wiring boards.

Optical waveguides typically include a core material and a cladding layer surrounding the core material. Optical radiation propagates in the core material and is contained by the cladding layer, which has a lower index of refraction than the core material. Waveguides may be used individually or as an array supported on a substrate, and typically transmit optical radiation across a substrate surface. The waveguides often perform a passive function on the optical radiation so as to modify the output signal from the input signal in a particular way. For example, splitters divide an optical signal in one waveguide into two or more waveguides; couplers add an optical signal from two or more waveguides into a smaller number of waveguides; and wavelength division multiplexing ("WDM") structures separate an input optical signal into spectrally discrete output waveguides, usually by employing either phase array designs or gratings. Spectral filters, polarizers, and isolators may be incorporated into the waveguide design. Waveguides may alternatively contain active functionality, wherein the input signal is altered by interaction with a second optical or electrical signal. Exemplary active functionality includes amplification and switching such as with electro-optic, thermo-optic or acousto-optic devices.

Various methods of manufacturing planar waveguides have been proposed. For example, waveguide core formation by depositing a bulk waveguide material on a substrate, followed by standard photolithography and etching processes using a photoresist on the bulk waveguide layer has been proposed. In an effort to decrease the number of processing steps and cost, the use of a photoimageable core layer in forming the waveguides has also been proposed. The core structures formed from these processes are generally square or rectangular in cross-section along the length of the waveguide. Such geometries, however, result in poor optical and insertion loss characteristics as a result of the geometrical mismatch between the waveguides and the cylindrical optical fibers to which the waveguides are typically coupled. This geometrical mismatch results in extra coupling loss at both input and output coupling ports, especially for multimode devices. Accordingly, provision of a waveguide having a core that is rounded and, more preferably, substantially circular in cross-section is desirable in order to improve light-transmission properties while reducing insertion loss due to optical fiber/waveguide coupling.

Syms et al, in *Reflow and Burial of Channel Waveguides Formed in Sol-Gel Glass on Si Substrates*, IEEE PHOTONICS TECH. LTTRS., Vol. 5, No. 9 (September 1993), discloses a process for fabricating waveguides by depositing a planar bilayer sol-gel glass film on a silicon substrate and etching the film to form ridge waveguides. Furnace heating is then used to melt the core and cladding glasses resulting in a smooth radius at the junction between the core and cladding. While the reflowed waveguide may provide improved loss characteristics when compared with a square or rectangular waveguide, the junction between the core and cladding is not ideal as the core is caused to spread out over the substrate.

U.S. Pat. No. 5,846,694, to Strand et al, discloses methods for manufacturing a waveguide that is nearly circular in cross-section. In the disclosed methods, a layer of an opposite material that a molten waveguide material will wet is patterned to form pedestals for a waveguide. A waveguide material is next deposited and patterned using photolithography and etching processes. Heat is applied to reflow the waveguide precursors into near-circular cross-section waveguides that sit atop the pedestals. This method has drawbacks in requiring multiple steps to define both the pedestal and the waveguide.

There is thus a need in the optoelectronics industry for improved methods of forming optical waveguides having enhanced optical and insertion loss characteristics in comparison with known, square and rectangular waveguides, as well as for waveguides formed therefrom. As well, there is a need in the art for electronic devices that include such waveguides as well as methods of forming such electronic devices.

SUMMARY OF THE INVENTION

Through the present invention, it has been surprisingly found that optical waveguides can be prepared which have improved light-transmission properties and lower insertion losses than known, square and rectangular planar waveguides.

In accordance with one aspect of the invention, methods of forming an optical waveguide are provided. The methods involve: (a) forming over a substrate a layer of a photodefinable composition; (b) exposing a portion of the layer to actinic radiation; (c) developing the exposed layer to form a waveguide core structure; and (d) heating the waveguide core structure to a temperature and for a time effective to reflow the structure such that it becomes at least partially rounded in cross-section.

In accordance with a further aspect of the invention, provided are methods of forming an optical waveguide. The methods involve: (a) providing a substrate having on a surface thereof a cladding layer of a material having an index of refraction; (b) forming over a portion of the cladding layer a waveguide core structure; and (c) heating the waveguide core structure to a temperature and for a time effective to reflow the structure such that it becomes at least partially rounded in cross-section, wherein the reflowed structure has an index of refraction greater than the index of refraction of the cladding layer.

In accordance with a further aspect of the invention, methods of forming an optical waveguide are provided. The methods involve: (a) providing a substrate having on a surface thereof a cladding layer of a material having a first index of refraction; and (b) forming by printing over a portion of the cladding layer a waveguide core structure having a second index of refraction that is greater than the first index of refraction, wherein the waveguide core structure as printed or embossed is at least partially rounded in cross-section.

In accordance with a further aspect of the invention, optical waveguides having a core and a cladding are provided. The optical waveguides can be formed from the described methods.

In accordance with a further aspect of the invention, electronic devices including one or more of the optical waveguides are provided.

BRIEF DESCRIPTION OF THE DRAWINGS

The present invention will be discussed with reference to the following drawings, in which like reference numerals denote like features, and in which.

DETAILED DESCRIPTION OF THE INVENTION

The present invention provides methods of forming optical waveguides, optical waveguides formed therefrom, and electronic devices formed from the optical waveguides. Unless otherwise specified, amounts of components of waveguide core and cladding compositions are provided in weight % based on the composition absent any solvent. As used herein, the term "polymer" includes oligomers, dimers, trimers, tetramers and the like, and encompasses both homopolymers and polymers formed from two or more different monomer units. The term "alkyl" includes linear, branched and cyclic alkyl. The term aromatic includes carbocycles and heterocycles. The terms "halogen" and "halo" include fluorine, chlorine, bromine, and iodine. Thus the term "halogenated" refers to fluorinated, chlorinated, brominated, and iodinated. The terms "a" and "an" mean one or more, unless otherwise indicated.

Figure 1:
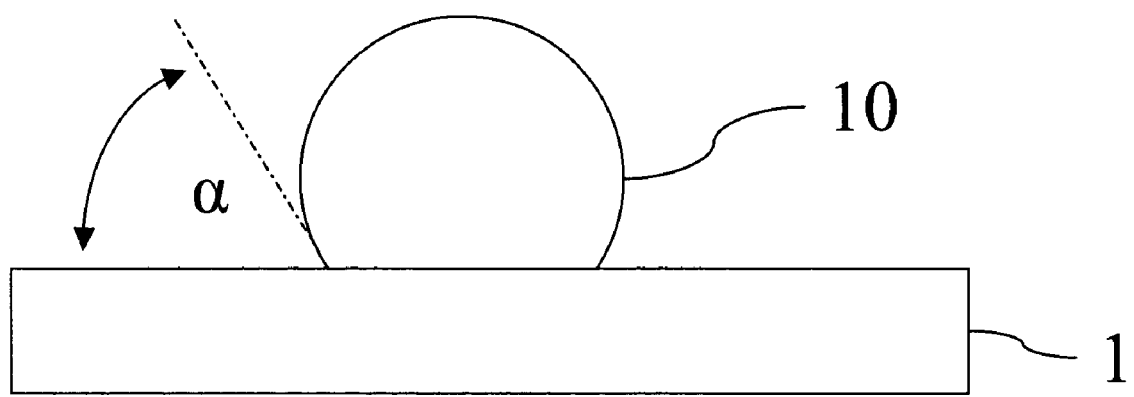
FIG. 1 illustrates in cross-section an optical waveguide in accordance with the invention.
Figure 2:
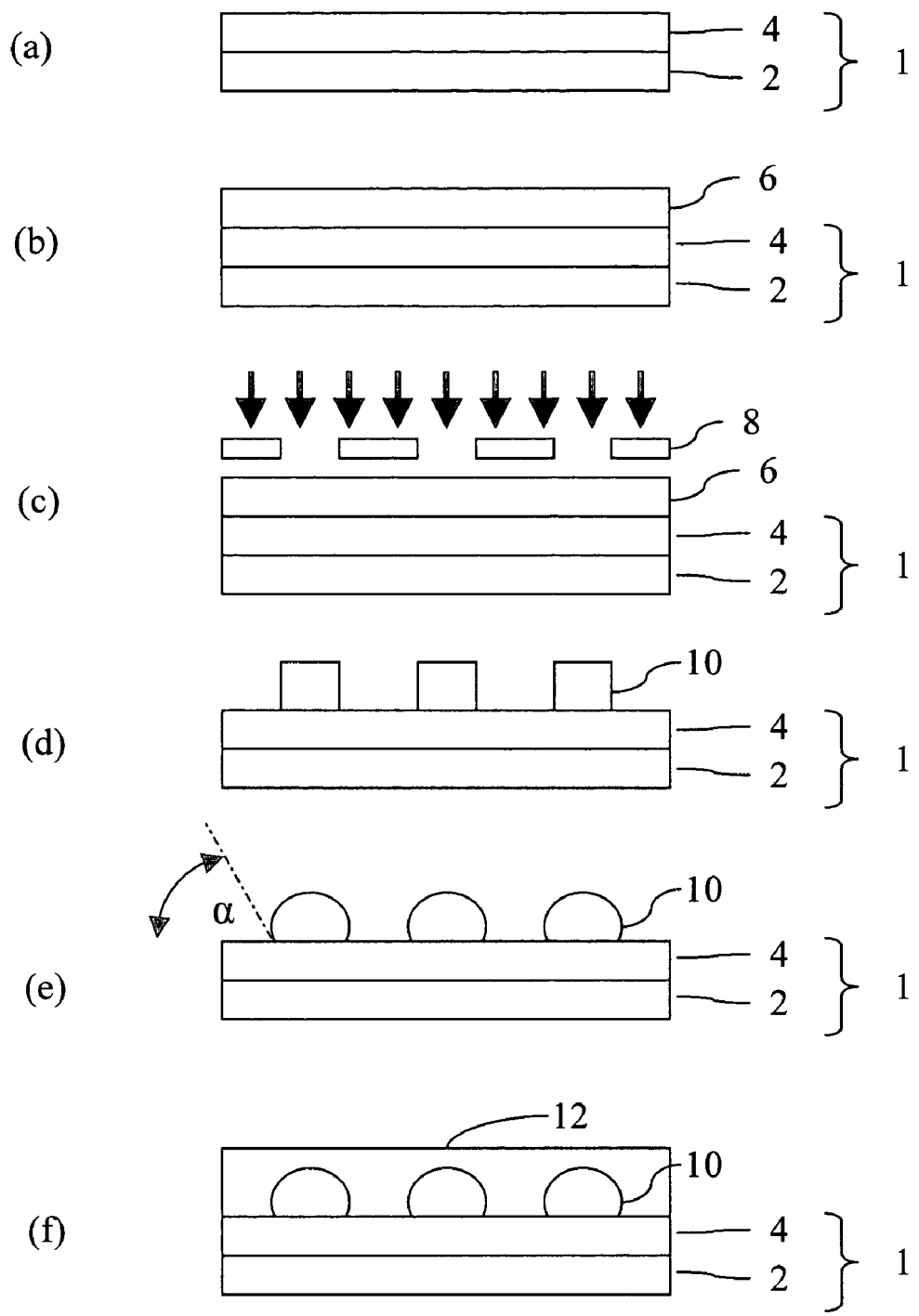
FIGS. 2(a)–(f) illustrate in cross-section an optical waveguide at various stages of formation thereof, in accordance with one aspect of the invention.
Figure 3:
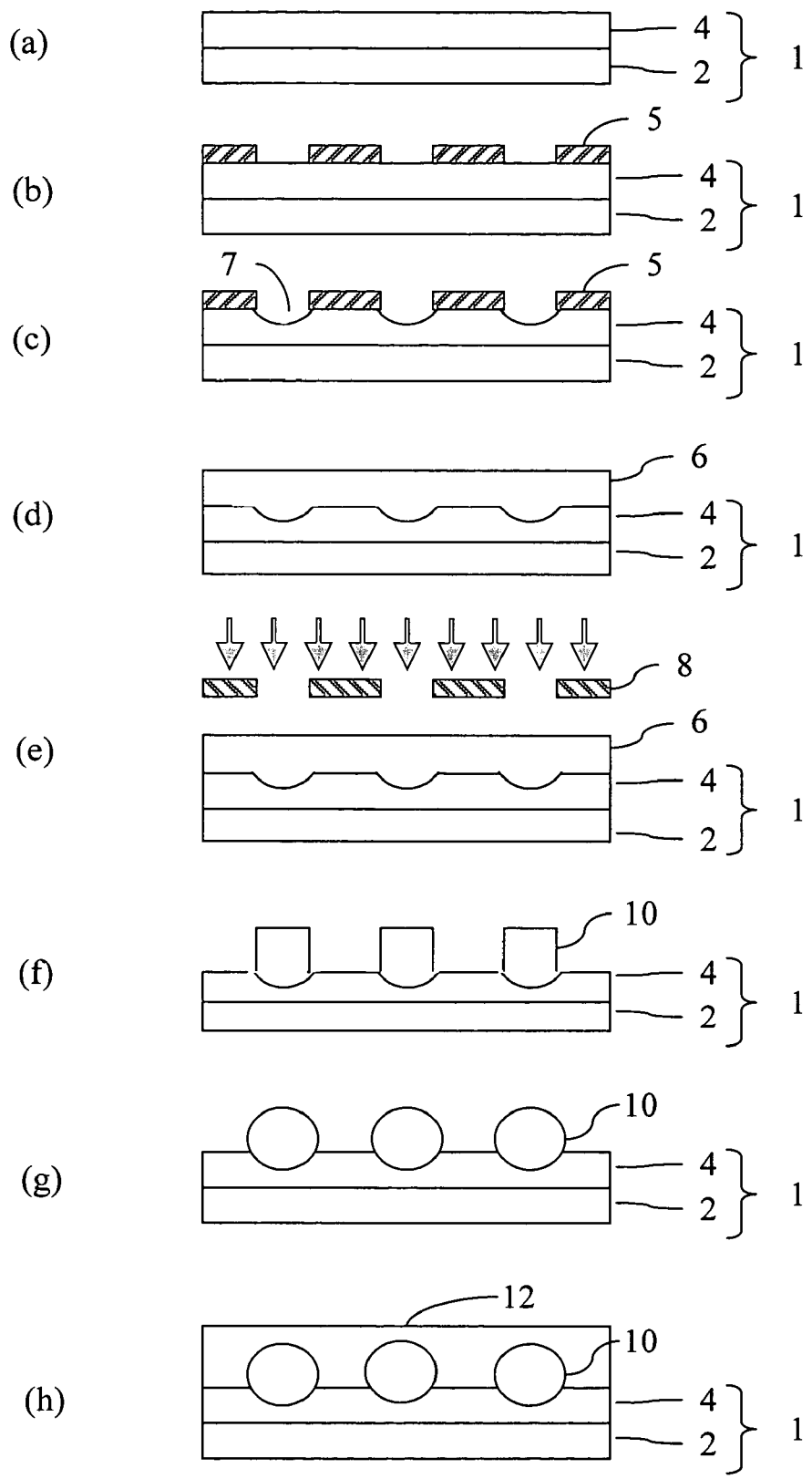
FIGS. 3(a)–(h) illustrate in cross-section an optical waveguide at various stages of formation thereof, in accordance with a further aspect of the invention.

By "quadrilateral shape in cross-section" is meant any generally four-sided shape in cross-section such as, but not limited to, generally rectangular, generally square, and generally trapezoidal cross-section. Such cross-sectional shapes may have rounded upper corners. With reference to FIG. 1, by "at least partially rounded in cross-section" is meant that the angle α formed at the point of contact between the waveguide core structure 10 and the underlying substrate 1 is less than 90°, for example, less than 80°, less than 70°, less than 60°, less than 45°, less than 30°, less than 20°, less than 10°, and 0° in the case of a perfectly circular cross-section. The core structures are generally concave immediately above the point of contact defining angle α and are generally circular or generally ovate in cross-section. As used herein, the term "generally circular" refers to circular, semicircular or hemicyclical. The term "hemicyclical" refers to a curved structure such as a circle having a flattened portion.

The present invention will now be described with reference to FIGS. 2(a)–(f), which illustrates in cross-section an optical waveguide at various stages of formation thereof, in accordance with one aspect of the invention. The methods in accordance with this aspect of the present invention allow for the preparation of optical waveguides by direct imaging of the waveguide cores. The optical waveguides formed in accordance with the present invention may be manufactured as individual waveguides or as arrays of waveguides.

With reference to FIG. 2(a), a substrate 1 is provided. Any substrate suitable for supporting an optical waveguide may be used. Suitable substrates include, but are not limited to, substrates used in the manufacture of electronic devices such as printed wiring boards and integrated circuits. Particularly suitable substrates include laminate surfaces and copper surfaces of copper clad boards, printed wiring board inner layers and outer layers, wafers used in the manufacture of integrated circuits such as silicon, gallium arsenide, and indium phosphide wafers, glass substrates including but not limited to liquid crystal display ("LCD") glass substrates, dielectric coatings, silicon oxides, silicon nitrides, silicon oxynitrides, sapphires, epoxy laminates, polyimides, polysiloxanes, cladding layers, and the like.

As illustrated, the substrate 1 includes a single crystal silicon wafer 2 and a first cladding layer 4, the specific material of which will depend to a large extent on the core material to be formed. In the final waveguide structure, the cladding material should have a lower index of refraction as compared to the core material. Particularly useful waveguides include a cladding having an index of refraction of from 1.3 to 1.69. Suitable materials for the cladding include, for example, any of the materials described throughout with respect to the core material, and other materials known to those skilled in the art. Typically, the thickness of the first cladding layer is from about 1 to 100 μm, more typically from about 10 to 50 μm In forming waveguides according to this aspect of the invention, the first cladding layer 4 can be coated using any of the techniques described below with reference to coating of the core layer. The first cladding layer is typically cured, for example, thermally and/or photolytically. Typically, the thermal curing temperature is from 130° C. to 300° C. and occurs over a period of from five seconds to one hour using, for example, an oven or hot plate. Additionally or alternatively to the thermal treatment, the waveguide can be flood exposed, for example, with 1 to 2 Joules/cm$^2$ of actinic radiation.

With reference to FIG. 2(b), a layer 6 of a photodefinable composition is deposited over the substrate 1. The composition forming the waveguide core should result in a core material having an index of refraction greater than that of the cladding material in order to contain the radiation to be transmitted therethrough. Particularly useful waveguides include a core having an index of refraction of from 1.4 to 1.7. Suitable photodefinable compositions include, for example, one or more constituent compound selected from polyamides, polyimides, poly(meth)acrylates, polyurethanes, polycarbonates, epoxies, polysiloxanes, polysilsesquioxanes, norbornenes, novolac resins, silicates, and sol-gels. The compounds may be unsubstituted or substituted, for example, with deuterium or one or more halogens such as fluorine.

Hybrid silicon-containing materials can also be employed in the photodefinable composition. For example, hybrid silsesquioxane polymers such as described in co-pending U.S. application Ser. No. 10/307,904, the entire contents of which are incorporated herein by reference, can be employed. Such silsesquioxane polymers may include units of the formula ($RSiO_{1.5}$). R refers to a substituted or unsubstituted organic side chain group that is free of hydroxy groups. Exemplary R groups include substituted and unsubstituted alkyl and aryl groups. Such alkyl groups can be straight chain, branched or cyclic having, for example, from 1 to 20 carbon atoms, such as methyl, ethyl, n-propyl, isopropyl, t-butyl, t-amyl, t-octyl, decyl, dodecyl, cetyl, stearyl, cyclohexyl and 2-ethylhexyl. Exemplary aryl groups include those having from 6 to 20, typically from 6 to 15, carbon atoms, such as phenyl, tolyl, 1-naphthyl, 2-naphthyl and 2-phenanthryl. The polymer can be a silsesquioxane homopolymer, in which case the silsesquioxane polymers have the general formula $(RSiO_{1.5})_n$, wherein R is as described above, and n is an even integer greater than zero. Exemplary silsesquioxane homopolymers include alkyl silsesquioxanes such as methyl silsesquioxane, ethyl silsesquioxane, propyl silsesquioxane, n-butyl silsesquioxane, isobutyl silsesquioxane, tert-butyl silsesquioxane, and the like, and aryl silsesquioxanes such as phenyl silsesquioxane and tolyl silsesquioxane. Alternatively, the polymer can take the form of a higher order polymer, either a random- or block-type. The higher order polymer can be, for example, a combination of two or more different types of silisesquioxane units with the proportions for each unit ranging from 1 to 99 mole %. The silsesquioxane polymer can include units of the formula ($R^1SiO_{1.5}$) and ($R^2SiO_{1.5}$), wherein $R^1$ and $R^2$ are different and are as described above with reference to R. The polymer can be, for example, an alkyl/aryl silsesquioxane such as a polymer containing methyl silsesquioxane and phenyl silsesquioxane or containing methyl silsesquioxane, ethyl silsesquioxane, and phenyl silsesquioxane; an alkyl silsesquioxane polymer such as a polymer containing methyl silsesquioxane and ethyl silsesquioxane; or an aryl silsesquioxane polymer such as a polymer containing phenyl silsesquioxane and tolyl silsesquioxane. The polymer can optionally include one or more non-silsesquioxane units, in addition to the silsesquioxane units. Such non-silsesquioxane units can be, for example, units of the formula (($R^3)_2SiO$), wherein $R^3$ is a substituted or unsubstituted organic group, such as an alkyl group, for example, methyl, ethyl, propyl, and the like, or an aryl group, for example, phenyl, tolyl, and the like. The The polymer can alternatively include a single type of silsesquioxane unit as defined above, together with one or more such non-silsesquioxane units. One or more hydrogen atoms on the side chain groups can be substituted by another substituent group, for example, deuterium, halogen such as fluorine, bromine, and chlorine, ($C_1$–$C_6$)alkyl, ($C_1$–$C_6$)haloalkyl, ($C_1$–$C_{10}$)alkoxy, ($C_1$–$C_{10}$)alkylcarbonyl, ($C_1$–$C_{10}$)alkoxycarbonyl, ($C_1$–$C_{10}$)alkylcarbonyloxy, and the like.

The silsesquioxane polymers may contain a wide range of repeating units. The silsesquioxane polymers may have, for example, from 5 to 150 repeating units, typically from about 10 to 35 repeating units. Typically, the polymers have a weight average molecular weight ($M_w$) of from about 500 to 15,000, for example, from about 1000 to 10,000 and from about 1000 to 5000. The polymers can further include two or more functional end groups that allow condensation polymerization to occur. Such end groups can be, for example, hydroxy, alkoxy such as ethoxy, propoxy, isopropoxy, carboxyester, amino, amido, epoxy, imino, carboxyacid, anhydride, olefinic, acrylic, acetal, orthoester, vinyl ether, and combinations thereof. The hydroxy content in the polymer is typically from about 0.5 to 15 mole % based on the polymer, for example from about 1 to 10 mole % and from about 2 to 5 mole %.

Use of porous optical materials, for example, those described in U.S. Published Application No. US20030008244, the entire contents of which are incorporated herein by reference, can also be employed in the photodefinable composition.

A photoactive component is also present in the photodefinable core composition to alter the solubility of the above-described constituent compounds upon exposure to actinic radiation. In the case of a negative working material, for example, the photoactive component catalyzes coupling of exposed portions of the constituent compound, rendering the coupled portions insoluble in a developer. A wide variety of photoactive components may be used in the present invention, including, but not limited to, photoacid generators and photobase generators. Of these, photoacid generators are preferred.

The photoacid generators useful in the present invention can be any compound or compounds which liberate acid upon exposure to light. Suitable photoacid generators are known and include, but are not limited to, halogenated triazines, halogenated oxadiazoles, onium salts, sulfonated esters, substituted hydroxyimides, substituted hydroxylimines, azides, naphthoquinones such as diazonaphthoquinones, diazo compounds, and combinations thereof.

Particularly useful halogenated triazines include, for example, halogenated alkyl triazines such as the halomethyl-s-triazines. The s-triazine compounds are condensation reaction products of certain methyl-halomethyl-s-triazines and certain aldehydes or aldehyde derivatives. Such s-triazine compounds may be prepared according to the procedures disclosed in U.S. Pat. No. 3,954,475 and Wakabayashi et al., *Bulletin of the Chemical Society of Japan*, 42, 2924–30 (1969). Other triazine type photoacid generators useful in the present invention are disclosed, for example, in U.S. Pat. No. 5,366,846, the entire contents of which are herein incorporated by reference.

Onium salts with weakly nucleophilic anions are particularly suitable for use as photoacid generators in the present invention. Examples of such anions are the halogen complex anions of divalent to heptavalent metals or non-metals, for example, antimony, tin, iron, bismuth, aluminum, gallium, indium, titanium, zirconium, scandium, chromium, hafnium, copper, boron, phosphorus and arsenic. Examples of suitable onium salts include, but are not limited to, diazonium salts such as diaryl-diazonium salts and onium salts of group VA and B, IIA and B and I of the Periodic Table, for example, halonium salts such as iodonium salts, quaternary ammonium, phosphonium and arsonium salts, sulphonium salts such as aromatic sulfonium salts, sulfoxonium salts or selenium salts. Examples of suitable onium salts are disclosed, for example, in U.S. Pat. Nos. 4,442,197; 4,603,101; and 4,624,912, the entire contents of which patents are incorporated herein by reference. Sulfonium salts such as triphenylsulfonium hexafluorophosphates and mixtures thereof are preferred.

The sulfonated esters useful as photoacid generators in the present invention include, for example, sulfonyloxy ketones. Suitable sulfonated esters include, but are not limited to, benzoin tosylate, t-butylphenyl alpha-(p-toluenesulfonyloxy)-acetate, 2,6-dinitrobenzyl tosylate, and t-butyl alpha-(p-toluenesulfonyloxy)-acetate. Such sulfonated esters are disclosed, for example, in the *Journal of Photopolymer Science and Technology*, vol. 4, No. 3,337–340 (1991), the entire contents of which are incorporated herein by reference.

Substituted hydroxyimides which can be used include, for example, n-trifluoromethylsulfonyloxy-2,3-diphenylmaleimide and 2-trifluoromethylbenzenesulfonyloxy-2,3-diphenylmaleimide. Suitable substituted hydroxylimines include, for example, 2-(nitrilo-2-methylbenzylidene)-(5-hydroxyiminobutylsulfonyl)-thiophene. Azides useful in the present invention include, for example, 2,6-(4-azidobenzylidene) cyclohexanone. Naphthoquinones can include, for example, 2,1-diazonaphthoquinone-4-sulfonate ester of 2,3,4-trihydroxybenzophenone. Among the diazo compounds, 1,7-bis (4-chlorosulonyl phenyl)-4-diazo-3,5-heptanedione can be used.

Photobase generators useful in the present invention can be any compound or compounds which liberate base upon exposure to light. Suitable photobase generators include, but are not limited to, benzyl carbamates, benzoin carbamates, O-carbamoylhydroxyamines, O-carbamoyloximes, aromatic sulfonamides, alpha-lactams, N-(2-allylethenyl)amides, arylazide compounds, N-arylformamides, 4-(ortho-nitrophenyl)dihydropyridines, and combinations thereof.

The amount of photoactive component useful in the present invention, in the case of a negative working material, is any amount sufficient to catalyze coupling of the silsesquioxane polymer upon exposure to actinic radiation to render the coupled portion insoluble in an aqueous-based or solvent-based developer. The photoactive component is typically present in the composition in an amount of from 0.1 to 25 wt %, more typically from 0.1 to 12 wt %.

One or more flexibilizer can optionally be included in the composition to impart a desired amount of flexibility to coatings or other products formed from the compositions. It may, for example, be beneficial to add a flexibilizer to compositions used in forming relatively thick coatings, such as those on the order of three or more microns, which have an increased susceptibility to the formation of cracks. While the particular flexibilizer selected will depend on the other components of the composition, typical flexibilizer materials include, for example, polysiloxanes and plasticizers such as long chain alkyds. Typically, the flexibilizer has two or more groups in its chain that are capable of coupling with the constituent compound. Preferred such groups include hydroxy, alkoxy, carboxyester, amino, amido, epoxy, imino, carboxyacid, anhydride, olefinic, acrylic, acetal, orthoester, vinyl ether, and combinations thereof. Of these groups, hydroxy is particularly preferred. Exemplary polysiloxane flexibilizer materials include polysiloxanes terminated with functional groups such as silanol-terminated polydiphenylsiloxanes and silanol-terminated polydimethylsiloxanes, typically in which the endgroups consist only of functional groups or flexible silsesquioxane polymers, for example, those formed from reacting 33 wt % methyl-triethoxy-silane, 33 wt % phenyl-triethoxy-silane, and 33 wt % dimethyl(dialkyl)-diethoxy-silane. The flexibilizer is typically present in the composition in an amount of less than 30 wt %, more specifically less than 20 wt %.

Other additives may optionally be present in the compositions of the invention including, but not limited to, surface leveling agents, for example silicone-base oils such as SILWET L-7604 silicone-base oil available from Dow Chemical Company, wetting agents, antifoam agents, adhesion promoters, thixotropic agents, and the like. Such additives are well known in the art for coating compositions. It will be appreciated that more than one additive may be combined in the core compositions. For example, a wetting agent may be combined with a thixotropic agent. Such optional additives are commercially available from a variety of sources. The amounts of such optional additives to be used will depend on the particular additive and desired effect, and are within the ability of those skilled in the art. Such other additives are typically present in the core composition in an amount of less than 5 wt %, more specifically less than 2.5 wt %.

The core compositions can optionally contain one or more organic cross-linking agent. Cross-linking agents include, for example, materials which link up components of the composition in a three-dimensional manner. Any aromatic or aliphatic cross-linking agent that reacts with the constituent component is suitable for use in the present invention. Such organic cross-linking agents will cure to form a polymerized network with the constituent component, and reduce solubility in a developer solution. Such organic cross-linking agents may be monomers or polymers. It will be appreciated by those skilled in the art that combinations of cross-linking agents may be used successfully in the present invention.

Suitable organic cross-linking agents useful in the present invention include, but are not limited to: amine containing compounds, epoxy containing materials, compounds containing at least two vinyl ether groups, allyl substituted aromatic compounds, and combinations thereof. Preferred cross-linking agents include amine containing compounds and epoxy containing materials.

The amine containing compounds useful as cross-linking agents in the present invention include, but are not limited to: a melamine monomers, melamine polymers, alkylolmethyl melamines, benzoguanamine resins, benzoguanamine-formaldehyde resins, urea-formaldehyde resins, glycouril-formaldehyde resins, and combinations thereof.

Epoxy containing materials useful as cross-linkers in the present invention are any organic compounds having one or more oxirane ring that are polymerizable by ring opening.

The photoimageable core compositions may suitably comprise only a single type of organic cross-linker, for example, only an amine containing cross-linker, or may contain two or more different cross-linkers. It will be appreciated by those skilled in the art that suitable organic cross-linker concentrations will vary with factors such as cross-linker reactivity and specific application of the composition. When used, the cross-linking agent(s) is typically present in the composition in an amount of from 0.1 to 50 wt %, more specifically from 0.5 to 25 wt %, and even more specifically from 1 to 20 wt %.

The photoimageable core compositions can optionally contain one or more solvent. Such solvents aid in formulating the compositions and in coating the present compositions on a substrate. A wide variety of solvents may be used. Suitable solvents include, but are not limited to, glycol ethers, such as ethylene glycol monomethyl ether, propylene glycol monomethyl ether, dipropylene glycol monomethyl ether; esters such asmethyl cellosolve acetate, ethyl cellosolve acetate, propylene glycol monomethyl ether acetate, dipropylene glycol monomethyl ether acetate, dibasic esters, carbonates such as propylene carbonate, γ-butyrolactone, esters such as ethyl lactate, n-amyl acetate and n-butyl acetate, alcohols such as n-propanol, iso-propanol, ketones such as cyclohexanone, methyl isobutyl ketone, diisobutyl ketone and 2-heptanone, lactones such as γ-butyrolactone and ε-caprolactone, ethers such as diphenyl ether and anisole, hydrocarbons such as mesitylene, toluene and xylene, and heterocyclic compounds such as N-methyl-2-pyrrolidone, N,N'-dimethylpropyleneurea, or mixtures thereof.

The photodefinable composition can be deposited by any technique, for example, screen printing, curtain coating, roller coating, slot coating, spin coating, flood coating, electrostatic spray, spray coating, or dip coating. When the composition is spray coated, a heated spray gun may optionally be used. The viscosity of the composition may be adjusted to meet the requirements for each method of application by viscosity modifiers, thixotropic agents, fillers and the like. Typically, the layer is coated to a thickness of from about 1 to 200 μm, more typically from about 1 to 100 μm, still more typically 2 to 80 μm, and still more typically from about 5 to 64 μm.

The coated substrate is typically then dried to remove any solvent in the coating. The drying can be conducted, for example, in an oven such as an infrared oven, a convection oven, a convection/conduction oven, a vacuum oven, or on a hot plate. Such drying may take place at various temperatures and times, depending upon the particular solvent chosen and the drying technique. Suitable temperatures are any that are sufficient to substantially remove any solvent present. Typically, the drying may be at any temperature from room temperature (25° C.) to 170° C. and at a time of from 5 seconds to 120 minutes. When using an oven, typical times are from 10 to 120 minutes and from 10 seconds to 10 minutes for a hot plate.

With reference to FIG. 2(c), after drying, the photoimageable layer 6 is imaged by exposure to actinic radiation, for example, through a photomask 8. Suitable exposure techniques include, for example, contact imaging, projection imaging, and laser direct write imaging. The exposure pattern defines the geometry of the waveguides, which is typically but not necessarily on the order of centimeters to meters in length, and microns to hundreds of microns in width. Following exposure, the composition can be partially cured, typically at a temperature of from 40° to 170° C. Curing time may vary but is generally from about 30 seconds to about 1 hour. The goal of this step is to further alter the solubility of the waveguide core pattern as compared to the other areas of the core layer such that the other areas can be removed in a developer solution without removing the core pattern. For example, in the case of a negative-acting material, the core pattern is the exposed region which becomes less soluble in the developer than the unexposed regions, while in the case of a positive-acting material, the core pattern is the unexposed region and the solubility of the exposed regions are rendered soluble in the developer solution.

With reference to FIG. 2(d), the unexposed areas in the case of a negative-working material or exposed areas in the case of a positive-acting material may be removed, such as by contact with a suitable developer, leaving a waveguide core structure 10. While the specific type of developer will depend on the material of the photoimageable layer, use of aqueous-based or solvent-based developers is envisioned. Suitable aqueous-based developers include, for example, alkali metal hydroxides such as sodium hydroxide and potassium hydroxide in water, as well as tetraalkylammonium hydroxide such as tetramethylammonium hydroxide, in water. Such developers are typically used in concentrations from 0.1 to 2N, more specifically 0.15 to 1N, even more specifically 0.26 to 0.7N. The developer solutions may optionally include one or more known surfactant, such as polyethylene glycol, alkyl sulfonates, and other surfactants well known in the art. The surfactant is typically present in the developer in an amount of from 0.5 to 3 wt %. Suitable solvent-based developers include, for example, alcohols such as ethanol, isopropyl alcohol, ketones, such as acetone, methyl isobutyl ketone, esters, such as ethyl acetate, and propylene glycol monomethyl ether acetate. Other suitable solvents are known to those skilled in the art. Development may take place at a variety of temperatures such as from room temperature to about 50° C. Development time with aggressive agitation is typically within ten minutes, preferably five minutes, more preferably within two minutes, even more preferably within one minute, and still more preferably within 30 seconds.

The dimensions of the core structures 10 will depend on various factors, such as the intended application and mode, e.g., single mode or multimode. The core structures as formed are typically of quadrilateral shape in cross-section, for example, square or rectangular with some possible rounding of corners, having a typical x- and y-dimension of from 2 to 200 μm, with a dimension of from about 5 to 10 μm being typical for single mode applications and 25 to 75 μm for multimode applications.

With reference to FIG. 2(e), following development, the waveguide core structures 10 undergo a process effective to provide an at least partially rounded cross-section. For example, the core structure can undergo a reflow step at a temperature and for a time effective to alter their cross-section to a generally hemicyclical shape, wherein the angle α between the core structure 10 and the substrate 1 is less than 90°. The reflow step can be conducted by any means capable of heating the core layer to the desired reflow temperature, defined as the temperature that alters the profile of the core. While the reflow step will depend on the specific material of the core structure, it typically is conducted at a temperature of from about 125° to 300° C., more typically from about 130 to 180° C., and for a time of from about 10 seconds to 120 minutes, in air or an inert atmosphere such as nitrogen or argon. The reflow step can be conducted in an oven such as a convection oven, a convection/conduction oven, a vacuum oven, or on a hot plate.

Without being bound by any particular theory, it is believed that the core material reflows prior to its becoming fully cured as a result of an in-situ change in the glass transition temperature ($T_g$) during ramp-up of the wafer temperature.

With reference to FIG. 2(f), a second cladding layer 12 is formed over the first cladding layer 4 and core structures 10. Suitable materials for the second cladding layer 12 include, for example, any of the materials described above with respect to the first cladding layer. The second cladding layer 12 may be of the same or a different material from the first cladding layer 4. However, the indices of refraction of the first and second cladding layers should be approximately the same. The second cladding layer is then thermally cured and/or photo-exposed to provide a waveguide structure. The description above with respect to curing of the first cladding layer applies to the second cladding layer as well. Typically, the second cladding layer is deposited to a thickness of from about 1 to 100 μm, more typically from about 10 to 50 μm. Optical waveguides in accordance with the invention are thus formed.

In accordance with a further aspect of the invention as exemplified in FIGS. 3(a)–(h), the photosensitive composition can be deposited on a substrate in which is formed a plurality of channels which will define a lower portion of the waveguides to be formed. This aspect of the invention allows for an optical waveguide more circular in cross-section than that shown in FIG. 2, with the potential for further improved light-transmission properties and reduced insertion loss due to better geometric matching between an optical fiber and the waveguide. Unless otherwise specified, the description above with reference to FIG. 2 applies also to FIG. 3 and the other figures. Further, while not exemplified, the use of channels as described with reference to the exemplary embodiment of FIG. 3 can be applied in combination with any of the other methods and waveguide structures described herein.

As shown in FIG. 3(b), an etching mask 5 is formed on the substrate 1, for example, using standard photolithographic techniques including resist coating, exposure and development steps. With reference to FIG. 3(c), the first cladding layer 4 of substrate 1 is then etched to form channels 7 in which the core structure will be formed. The channels 7 can take various shapes, for example, semicircular, or semiovate in cross-section. When substantially semicircular in shape, a more circular waveguide can be formed which may provide a good geometric match with the end face of an optical fiber. Suitable etching techniques for forming the channels 7 are known in the art, and include, for example, wet, dry or a combination of wet and dry etching techniques. The specific etchant will depend on the material being removed, but may include, for example, hydrofluoric acid, oxygen plasma, and other etchants known to those skilled in the art. The etching mask 5 is next removed from the substrate surface, and the photoimageable layer 6 is deposited as shown in FIG. 3(d) and described above. With reference to FIG. 3(e), the photoimageable layer 6 is exposed to actinic radiation and developed, resulting in waveguide core structures 10 formed in and above the channels 7 as shown in FIG. 3(f). The waveguide core structures 10 are reflowed to round their cross-sectional shape as shown in FIG. 3(g), and a second cladding layer 12 is deposited over the first cladding layer 4 and waveguide core structures as shown in FIG. 3(h), thus resulting in optical waveguides in accordance with the invention.

Figure 4:
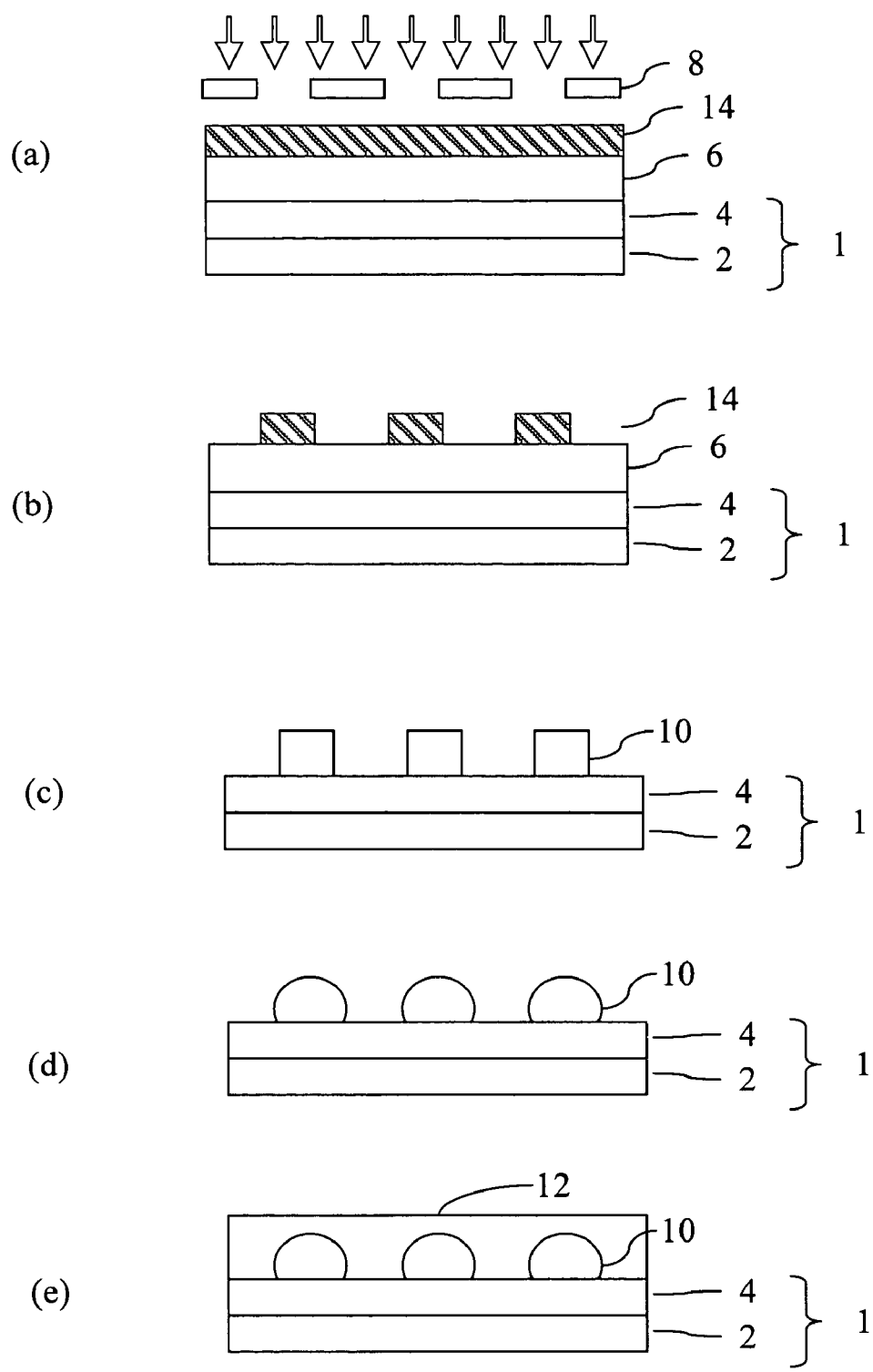
FIGS. 4(a)–(e) illustrate in cross-section an optical waveguide at various stages of formation thereof, in accordance with a further aspect of the invention.
Figure 5:
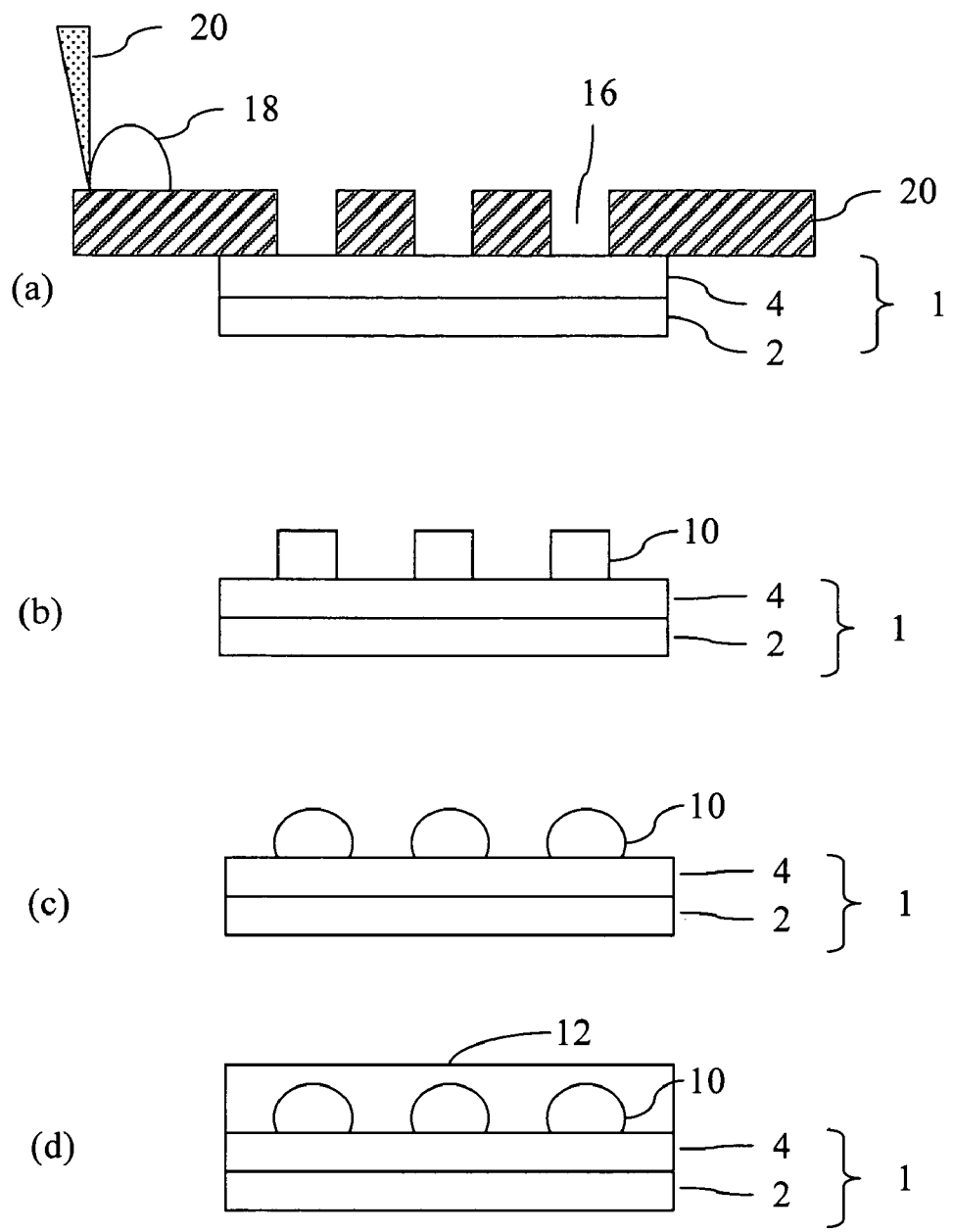
FIGS. 5(a)–(d) illustrate in cross-section an optical waveguide at various stages of formation thereof, in accordance with a further aspect of the invention.
Figure 6:
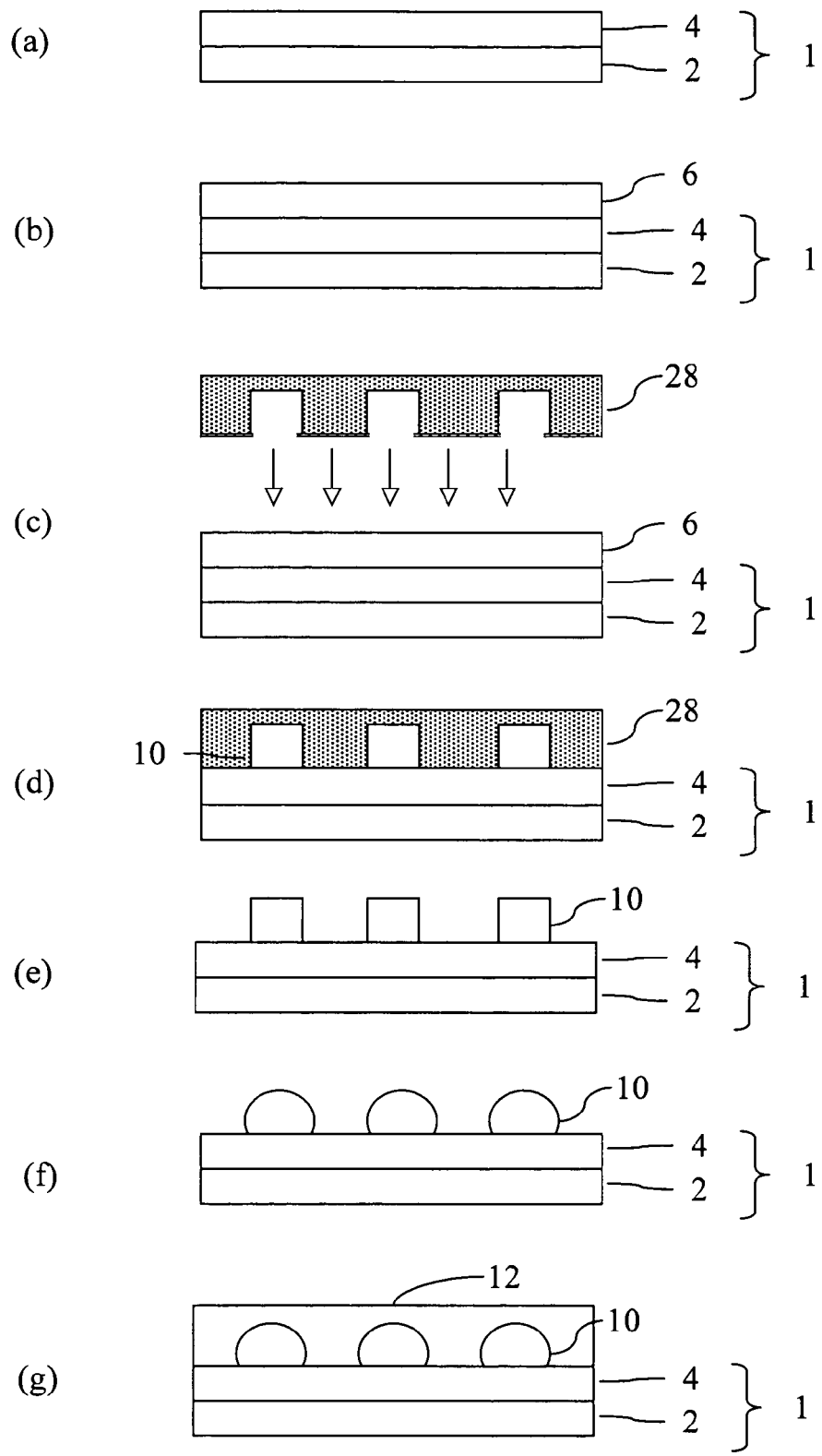
FIGS. 6(a)–(g) illustrate in cross-section an optical waveguide at various stages of formation thereof, in accordance with a further aspect of the invention.

In accordance with a further aspect of the invention and as exemplified in FIGS. 4–6, the waveguide core structures can be patterned in a manner other than by direct photoimaging. In this case, the above-described photoimageable materials may be used. More typically, however, the above-described materials would be used without the photoactive component. Other suitable materials in addition to those materials include, for example, silicon oxides, silicon nitrides, silicon oxynitrides, and doped glasses.

As shown in FIGS. 4(a)–(e), a layer of a photoresist 14 can be formed on the core layer 6. The material is then patterned by exposure to actinic radiation through a mask 8. The core layer 6 is next etched, for example, using dry anisotropic etch chemistry, to form the waveguide core structures 10. Depending on the particular materials employed and the differences in etch selectivity, it may be beneficial to employ an etch stop layer, for example, a silicon nitride, SOG, or other known etch stop layer between the cladding layer 4 and core layer 6. Such etch stop layers and their use are known to those skilled in the art. With reference to FIGS. 4(d)–(e), the waveguide core structures are then reflowed and the waveguides are completed as described above.

FIGS. 5(a)–(d) illustrate a further exemplary technique for patterning the waveguide core structures, by a screen printing technique. As shown in FIG. 5(a), a screen 20 having openings 16 is placed in contact with the substrate 1. The waveguide core material 18 is spread over the screen and into the openings 16 by use of a tool 20 such as a doctor blade. The screen is then removed, leaving the waveguide core structures 10 as illustrated in FIG. 5(b). With reference to FIGS. 5(c)–(d), the waveguide core structures are then reflowed and the waveguides are completed as described above.

FIGS. 6(a)–(g) illustrate a further exemplary technique for patterning the waveguide core structures, by an embossing method. As shown in FIGS. 6(c)–(d), an embossing dye 28 is brought into contact under pressure with the waveguide core layer 6 and substrate 1. The dye 28 is removed, leaving waveguide core structures 10, as shown in FIG. 6(e). With reference to FIGS. 6(f)–(g), the waveguide core structures are completed as described above.

In accordance with a further aspect of the invention, the desired, rounded cross-section of the optical waveguides can be attained directly without the need for a reflowing step. This can be accomplished through techniques such as gravure printing, transfer printing, or ink jet printing. The same materials described above for forming the core structures can be used with this aspect of the invention. Depending on the coating technique employed, it may be beneficial to adjust the viscosity of the material prior to coating to a level consistent with the particular technique. Such viscosity adjustment would be within the knowledge and capability of persons skilled in the art.

Figure 7:
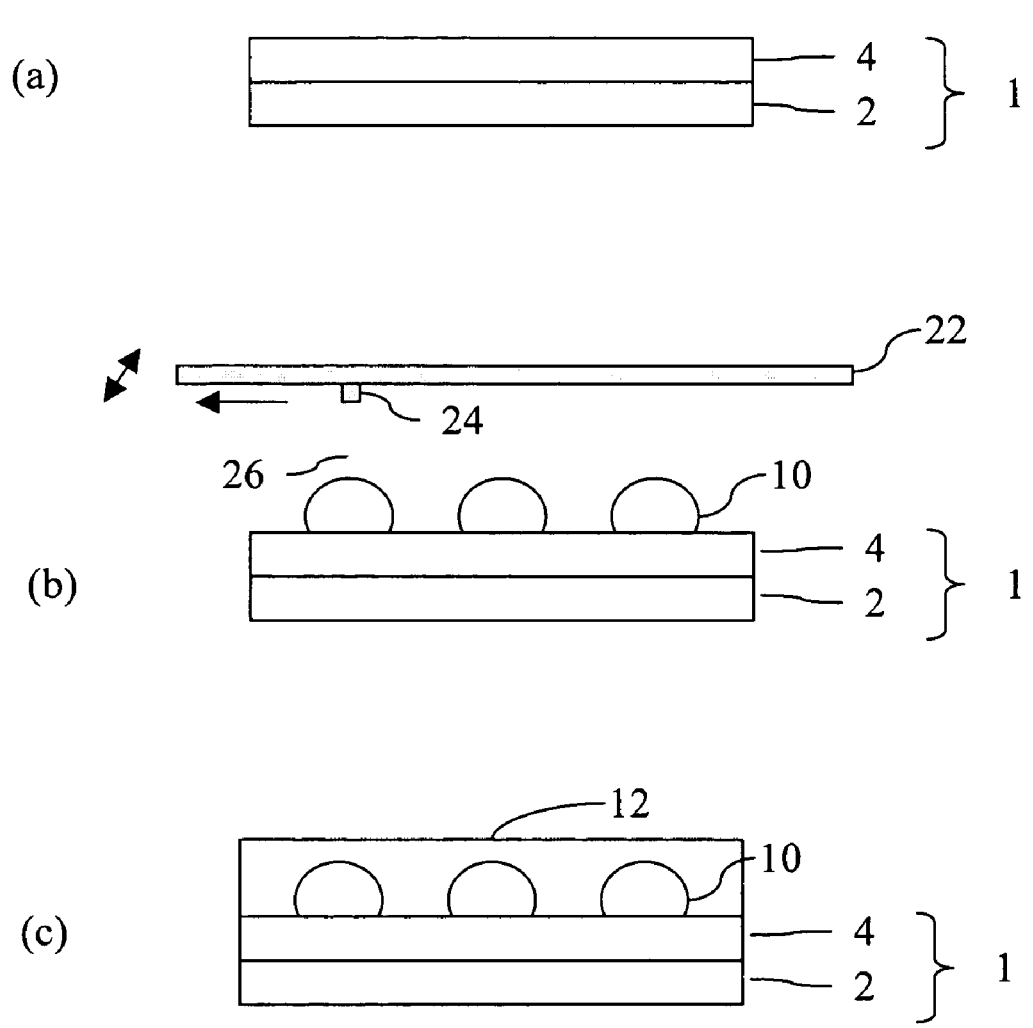
FIGS. 7(a)–(c) illustrate in cross-section an optical waveguide at various stages of formation thereof, in accordance with a further aspect of the invention.

FIGS. 7(a)–(c) illustrate in cross-section an optical waveguide formed at various stages by an ink-jet printing method. As shown in FIG. 7(b), the waveguide core structures 10 of rounded cross-section are directly printed on the surface of the substrate 1 with an ink-jet printer 22. The printer head 24 traverses across the substrate surface and deposits the waveguide core composition 26 onto the substrate surface to form the core structures. Optionally, the waveguide structure can be heated to further adjust the extent of circularity of the cross-section. With reference to FIG. 7(c), the waveguide core structures are completed as described above.

The optical waveguides formed in accordance with the invention can be used in a variety of applications, particularly in the manufacture of opto-electrical devices including, but not limited to, splitters, couplers, spectral filters, polarizers, isolators, multiplexers such as wavelength division multiplexing structures, amplifiers, attenuators, switches, and the like or, on a larger scale, in electronic devices such as printed wiring boards, integrated circuits, interconnects, and the like. As used herein, the term electronic device is intended to encompass opto-electronic devices, for example, those described above, as well as the aforementioned larger scale devices that include an opto-electronic device.

Optical waveguides of the present invention possess excellent transparencies at a variety of wavelengths and provide excellent optical loss characteristics. Thus, the present optical waveguides may be used at, for example, 600 to 1700 nm. It will be appreciated that the present optical waveguides may be advantageously used at other wavelengths. Thus, the present optical waveguides are particularly suited for use in data communications and telecommunications applications.

The following examples are intended to illustrate further various aspects of the present invention, but are not intended to limit the scope of the invention in any aspect.

EXAMPLES

Example 1

50 wt % propylene glycol monomethyl ether acetate, 49 wt % phenyl-methyl silsesquioxane (50:50), 0.99 wt % triphenylsulfonium hexafluorophosphate, and 0.01 wt % Dow SILWET L-7604 silicone-base oil are combined in admixture. The composition is spin-coated at 2000 rpm onto a six-inch silicon dioxide-coated silicon wafer and soft-baked in air on a hot plate for two minutes at 90° C., to a thickness of 8 μm. Artwork defining the required waveguide is placed directly on the composition. The artwork includes patterns for forming waveguides of various dimensions and shapes, such as linear, branched, and curved shaped waveguides between 2 and 14 cm in length and 5 to 15 μm in width. 800 mJ/cm² of actinic radiation is applied to the construction followed by a post-exposure-bake in air at 90° C. for two minutes. The exposed wafer is then dipped in a 0.7N sodium hydroxide developer solution held at 37.8° C. (100° F.) for 30 seconds. The wafer is then rinsed in de-ionized water and dried. The wafer is then heated at 150° C. for 10 minutes on a hot plate. It is expected that cylindrical optical waveguides are thereby formed.

Example 2

33 wt % propylene glycol monomethyl ether acetate, 66.09 wt % phenyl-methyl silsesquioxane (50:50), and 0.01 wt % Dow SILWET L-7604 silicone-base oil are combined in admixture. The composition is screen-printed onto a six-inch silicon dioxide-coated silicon wafer and soft-baked in air on a hot plate for two minutes at 90° C., to a thickness of 8 μm. The screen used in this process is predefined with openings for waveguide placement including patterns for forming waveguides of various dimensions and shapes, such as linear, branched, and curved shaped waveguides between 2 and 14 cm in length and 5 to 15 μm in width. The wafer is then heated at 150° C. for 10 minutes on a hot plate. It is expected that cylindrical optical waveguides are thereby formed.

Example 3

37 wt % propylene glycol monomethyl ether acetate, 53 wt % phenyl-methyl silsesquioxane (80:20), 5 wt % triphenylsulfonium trifluoromethylsulphonate, 4.99 wt % polyphenylsiloxane, and 0.01 wt % Dow SILWET L-7604 silicone-base oil are combined in admixture. The composition is spin-coated at 3000 rpm onto a six-inch silicon dioxide-coated silicon wafer and soft-baked in air on a hot plate for two minutes at 90° C., to a thickness of 8 μm. Artwork as described in Example 1 is placed directly on the composition. 500 mJ/cm² of actinic radiation is applied to the construction followed by a post-exposure-bake in air at 90° C. for two minutes. The exposed wafer is then dipped in a 0.7N sodium hydroxide developer solution held at 21° C. for 30 seconds. The wafer is then rinsed in de-ionized water and dried. The wafer is heated to 150° C. for 10 minutes. It is expected that cylindrical optical waveguides are thereby formed.

Example 4

37 wt % ethyl lactate, 53 wt % of the condensation reaction product of 45 wt % phenyl-triethoxysilane, 45 wt % methyl-triethoxysilane, and 10 wt % dimethyl-diethoxysilane, 5 wt % of the condensation reaction product of 33% phenyl-triethoxysilane, 33 wt % methyl-triethoxysilane, and 34 wt % dimethyl-diethoxysilane, 4.99 wt % 2,4-bis-(trichloromethyl)-6-(4-ethoxyethoxy-1-naphthyl)-triazine, and 0.01 wt % Dow SILWET L-7604 silicone-base oil are combined in admixture. The composition is spin-coated at 3000 rpm onto a six-inch LCD glass substrate and soft-baked in air on a hot plate for two minutes at 90° C., to a thickness of 8 μm. Artwork as described in Example 1 is placed directly on the composition. 800 mJ/cm² of actinic radiation is applied to the wafer followed by a post-exposure-bake in air at 90° C. for two minutes. The exposed wafer is then dipped in a 0.26N sodium hydroxide developer solution held at 37.8° C. (100° F.) for 90 seconds. The wafer is then rinsed in de-ionized water and dried. The wafer is heated to 150° C. for 10 minutes. It is expected that cylindrical optical waveguides are thereby formed.

Example 5

37 wt % ethyl lactate, 53 wt % of the condensation reaction product of 55 wt % phenyl-triethoxysilane, 35 wt % methyl-triethoxysilane, and 10 wt % dimethyl-diethoxysilane, 5 wt % of Polydiethoxysiloxane, 4.99 wt % triphenylsulfonium hexafluorophosphate, and 0.01 wt % Dow SILWET L-7604 silicone-base oil are combined in admixture. An epoxy laminate, such as commonly used in printed wiring board manufacture is roller-coated with the composition to a thickness of 15 μm and dried in air in a convection oven for 30 minutes at 90° C. Artwork as described in Example 1 is placed directly on the composition. 800 mJ/cm² of actinic radiation is applied to the construction followed by a post-exposure-bake in air at 90° C. for 30 minutes. The exposed structure is then dipped in a 0.7N sodium hydroxide developer solution held at 37.8° C. (100° F.) for 60 seconds. The laminate is then rinsed in de-ionized water and dried. The resultant waveguides are heated to 180° C. for 30 minutes in a convection oven. It is expected that cylindrical optical waveguides are thereby formed.

Example 6

38.95 wt % propylene glycol monomethyl ether acetate, 55 wt % of the condensation reaction product of 55 wt % phenyl-triethoxysilane, 43 wt % methyl-triethoxysilane, and 2 wt % dimethyl-diethoxysilane, 5 wt % polydiphenylsiloxane, 1.00 wt % triphenylsulfonium trifluoromethylsulfonate, and 0.05 wt % Dow SILWET L-7604 silicone-base oil are combined in admixture. The composition is spin-coated at 2500 rpm onto a six-inch silicon dioxide-coated silicon wafer and soft-baked in air on a hot plate for two minutes at 90° C., to a thickness of 8 μm. Artwork as described in Example 1 is placed directly on the composition. 800 mJ/cm² of actinic radiation is applied to the construction followed by a post-exposure-bake in air at 90° C. for two minutes. The exposed wafer is then dipped in a 0.7N sodium hydroxide developer solution held at 37.8° C. (100° F.) for 60 seconds. The wafer is then rinsed in de-ionized water and dried. The wafer is heated to 180° C. in air for 10 minutes on a hot plate. It is expected that cylindrical optical waveguides are thereby formed.

Example 7

66 wt % Propylene glycol monomethyl ether acetate, 21.7 wt % isobutyl ester of styrene maleic anhydride, 1.7 wt %

2,2-Dimethoxy-2-phenyl acetophenone, 4.1 wt % Pentaerythritol triacrylate, and 6.1 wt % Ethoxylate trimethylolpropane triacrylate are combined in admixture. An epoxy laminate, such as commonly used in printed wiring board manufacture, is roller-coated with the composition to a thickness of 15 μm and dried in air in a convection oven for 30 minutes at 90° C. Artwork as described in Example 1 is placed directly on the composition. 200 mJ/cm$^2$ of actinic radiation is applied to the construction. The exposed structure is then dipped in a 0.4N sodium carbonate developer solution held at 35° C. (95° F.) for 120 seconds. The laminate is then rinsed in de-ionized water and dried. The resultant waveguides are heated to 150° C. for 30 minutes in a convection oven. It is expected that cylindrical optical waveguides are thereby formed.

Example 8

50 wt % Propylene glycol monomethyl ether acetate, 40 wt % Novolac resin prepared from the condensation of meta cresol and formaldehyde under acid conditions, and 10 wt % of the reaction product of 2,1-diazonaphthylquinone-5-sulfonyl chloride and 2,3,4-trihydroxybenzophenone are combined in admixture. A copper-clad epoxy laminate, such as commonly used in printed wiring board manufacture, is roller-coated with the composition to a thickness of 15 μm and dried in air in a convection oven for 30 minutes at 90° C. Artwork as described in Example 1 but with reverse tone, i.e, the desired waveguides are black on the artwork, is placed directly on the composition. 500 mJ/cm$^2$ of actinic radiation is applied to the construction. The exposed structure is then dipped in a 0.7N sodium hydroxide developer solution held at 37.8° C. (100° F.) for 100 seconds. The laminate is then rinsed in de-ionized water and dried. The resultant waveguides are heated to 180° C. for 30 minutes in a convection oven. It is expected that cylindrical optical waveguides are thereby formed.

Example 9

37 wt % propylene glycol monomethyl ether acetate, 53 wt % of the condensation reaction product of 79 wt % phenyl-triethoxysilane, 19 wt % trifluoromethyl-triethoxysilane, and 2 wt % dimethyl-diethoxysilane, 5 wt % polydiphenylsiloxane, 4.95 wt % triphenylsulfonium hexafluorophosphate, and 0.05 wt % Dow SILWET L-7604 silicone-base oil are combined in admixture. The composition is spin-coated at 2500 rpm onto a six-inch silicon dioxide-coated silicon wafer and soft-baked in air on a hot plate for two minutes at 90° C., to a thickness of 8 μm. Artwork as described in Example 1 is placed directly on the composition. 800 mJ/cm$^2$ of actinic radiation is applied to the construction followed by a post-exposure-bake in air at 90° C. for two minutes. The exposed wafer is then dipped in a 0.26N tetramethyl ammonium hydroxide developer solution held at 37.8° C. (100° F.) for 60 seconds. The wafer is then rinsed in de-ionized water and dried. The wafer is heated to 180° C. in air for 10 minutes on a hot plate. It is expected that cylindrical optical waveguides are thereby formed.

Example 10

45 wt % propylene glycol monomethyl ether acetate, 45 wt % of the condensation reaction product of 49 wt % phenyl-triethoxysilane, 49 wt % methyl-triethoxysilane, and 2 wt % dimethyl-diethoxysilane, 5 wt % polydiphenylsiloxane, 4.95 wt % benzoin tosylate, and 0.05 wt % Dow SILWET L-7604 silicone-base oil are combined in admixture. The composition is spin-coated at 2500 rpm onto a six-inch silicon dioxide-coated silicon wafer and soft-baked in air on a hot plate for two minutes at 90° C., to a thickness of 8 μm. Artwork as described in Example 1 is placed directly on the composition. 2000 mJ/cm$^2$ of actinic radiation is applied to the construction followed by a post-exposure-bake in air at 90° C. for two minutes. The exposed wafer is then dipped in a 0.35N sodium hydroxide developer solution held at 37.8° C. (100° F.) for 60 seconds. The wafer is then rinsed in de-ionized water and dried. The wafer is heated to 150° C. in air for 10 minutes on a hot plate. It is expected that cylindrical optical waveguides are thereby formed.

Example 11

41 wt % propylene glycol monomethyl ether acetate, 41 wt % of the condensation reaction product of 65 wt % phenyl-triethoxysilane, 33 wt % methyl-triethoxysilane, and 2 wt % dimethyl-diethoxysilane, 10 wt % hexamethylolmethane-melamine, 4 wt % polydiethoxysiloxane, 3.95 wt % triphenylsulfonium trifluoromethylsulfonate, and 0.05 wt % Dow SILWET L-7604 silicone-base oil are combined in admixture. The composition is spin-coated at 2000 rpm onto a six-inch silicon dioxide-coated silicon wafer and soft-baked in air on a hot plate for two minutes at 90° C., to a thickness of 8 μm. Artwork as described in Example 1 is placed directly on the composition. 800 mJ/cm$^2$ of actinic radiation is applied to the construction followed by a post-exposure-bake in air at 90° C. for two minutes. The exposed wafer is then dipped in a 0.7N sodium hydroxide developer solution held at 37.8° C. (100° F.) for 30 seconds. The wafer is then rinsed in de-ionized water and dried. The wafer is heated to 150° C. in air for 10 minutes on a hot plate. It is expected that cylindrical optical waveguides are thereby formed.

Example 12

50 wt % propylene glycol monomethyl ether acetate, 49.99 wt % phenyl-methyl silsesquioxane (50:50), and 0.01 wt % Dow SILWET L-7604 silicone-base oil are combined in admixture. The composition is spin-coated at 5000 rpm onto a six-inch silicon dioxide-coated silicon wafer and soft-baked in air on a hot plate for two minutes at 90° C., to a thickness of 8 μm. A positive working photoresist is spin-coated onto the wafer at 2500 rpm. Artwork defining the required waveguide is placed directly on the composition. The artwork includes patterns for forming waveguides of various dimensions and shapes, such as linear, branched, and curved shaped waveguides between 2 and 14 cm in length and 5 to 15 μm in width. 400 mJ/cm$^2$ of actinic radiation is applied to the construction followed by a post-exposure-bake in air at 90° C. for two minutes. The photoresist is developed in a 0.2N sodium hydroxide solution to expose portions of the waveguide material. The exposed portions of the waveguide material are removed by reactive ion etching (RIE) and the photoresist is removed with 2N sodium hydroxide solution. The wafer is rinsed in de-ionized water, dried, and then heated at 150° C. for 10 minutes on a hot plate. It is expected that cylindrical optical waveguides are thereby formed.

Example 13

Clad (1) Layer

A first cladding layer composition is formed by combining in admixture 50 wt % propylene glycol monomethyl ether acetate, 49.99 wt % phenyl-methyl silsesquioxane (50:50), and 0.01 wt % Dow SILWET L-7604 silicone-base oil. The composition is spin-coated at 2000 rpm onto a six-inch silicon dioxide-coated silicon wafer and soft-baked in air on a hot plate for two minutes at 90° C., to a thickness of 7 µm. The composition is then hard-baked in air on a hot plate for ten minutes at 200° C.

Core

The first cladding layer is coated with a core layer and the core layer is patterned and reflowed using the composition and procedures described in Example 1.

Clad (2) Layer

A second cladding layer composition is formed over the patterned core and first cladding layer using the same composition and procedures used in forming the first cladding layer, except the thickness of the second cladding layer after the soft-bake is 10 µm. It is expected that cylindrical optical waveguides are thereby formed.

Example 14

Clad (1) Layer

A first cladding layer composition is formed by combining in admixture 33 wt % propylene glycol monomethyl ether acetate, 66.09 wt % phenyl-methyl silsesquioxane (33:67), and 0.01 wt % Dow SILWET L-7604 silicone-base oil. The composition is spin-coated at 3000 rpm onto a six-inch silicon dioxide-coated silicon wafer and soft-baked in air on a hot plate for two minutes at 90° C., to a thickness of 7 µm. The composition is then hard-baked in air on a hot plate for ten minutes at 200° C.

Core

The first cladding layer is coated with a core layer and the core layer is patterned and reflowed using the composition and procedures described in Example 2.

Clad (2) Layer

A second cladding layer composition is formed over the patterned core and first cladding layer using the same composition and procedures used in forming the first cladding layer, except the thickness of the second cladding layer after the soft-bake is 10 µm. It is expected that cylindrical optical waveguides are thereby formed.

Example 15

Clad (1) Layer

A first cladding layer composition is formed by combining in admixture 40 wt % propylene glycol monomethyl ether acetate, 55 wt % phenyl-methyl silsesquioxane (80:20), 4.99 wt % polyphenylsiloxane, and 0.01 wt % Dow SILWET L-7604 silicone-base oil. The composition is spin-coated at 3000 rpm onto a six-inch silicon dioxide-coated silicon wafer and soft-baked in air on a hot plate for two minutes at 90° C., to a thickness of 7 µm. The composition is then hard-baked in air on a hot plate for ten minutes at 200° C.

Core

The first cladding layer is coated with a core layer and the core layer is patterned and reflowed using the composition and procedures described in Example 3.

Clad (2) Layer

A second cladding layer composition is formed over the patterned core and first cladding layer using the same composition and procedures used in forming the first cladding layer, except the thickness of the second cladding layer after the soft-bake is 10 µm. It is expected that cylindrical optical waveguides are thereby formed.

Example 16

Clad (1) Layer

A first cladding layer composition is formed by combining in admixture 40 wt % ethyl lactate, 54.99 wt % of the condensation reaction product of 45 wt % phenyl-triethoxysilane, 45 wt % methyl-triethoxysilane, and 10 wt % dimethyl-diethoxysilane, 5 wt % of the condensation reaction product of 33% phenyl-triethoxysilane, 33 wt % methyl-triethoxysilane, and 34 wt % dimethyl-diethoxysilane, and 0.01 wt % Dow SILWET L-7604 silicone-base oil. The composition is spin-coated at 3000 rpm onto a six-inch silicon dioxide-coated silicon wafer and soft-baked in air on a hot plate for two minutes at 90° C., to a thickness of 7 µm. The composition is then hard-baked in air on a hot plate for ten minutes at 200° C.

Core

The first cladding layer is coated with a core layer and the core layer is patterned and reflowed using the composition and procedures described in Example 4.

Clad (2) Layer

A second cladding layer composition is formed over the patterned core and first cladding layer using the same composition and procedures used in forming the first cladding layer, except the thickness of the second cladding layer after the soft-bake is 10 µm. It is expected that cylindrical optical waveguides are thereby formed.

Example 17

Clad (1) Layer

A first cladding layer composition is formed by combining in admixture 40 wt % ethyl lactate, 54.99 wt % of the condensation reaction product of 45 wt % phenyl-triethoxysilane, 45 wt % methyl-triethoxysilane, and 10 wt % dimethyl-diethoxysilane, 5 wt % of Polydiethoxysiloxane, and 0.01 wt % Dow SILWET L-7604 silicone-base oil. An epoxy laminate, such as commonly used in printed wiring board manufacture is roller-coated with the composition and soft-baked in air for two minutes at 90° C., to a thickness of 7 µm. The composition is then hard-baked in air for ten minutes at 200° C.

Core

The first cladding layer is coated with a core layer and the core layer is patterned and reflowed using the composition and procedures described in Example 5.

Clad (2) Layer

A second cladding layer composition is formed over the patterned core and first cladding layer using the same composition and procedures used in forming the first cladding layer, except the thickness of the second cladding layer after the soft-bake is 10 µm. It is expected that cylindrical optical waveguides are thereby formed.

Example 18

Clad (1) Layer

A first cladding layer composition is formed by combining in admixture 39.95 wt % propylene glycol monomethyl ether acetate, 55 wt % of the condensation reaction product of 49 wt % phenyl-triethoxysilane, 49 wt % methyl-triethoxysilane, and 2 wt % dimethyl-diethoxysilane, 5 wt % polydiphenylsiloxane, and 0.05 wt % Dow SILWET L-7604 silicone-base oil. The composition is spin-coated at 3000 rpm onto a six-inch silicon dioxide-coated silicon wafer and soft-baked in air on a hot plate for two minutes at 90° C., to a thickness of 7 µm. The composition is then hard-baked in air on a hot plate for ten minutes at 200° C.

Core

The first cladding layer is coated with a core layer and the core layer is patterned and reflowed using the composition and procedures described in Example 6.

Clad (2) Layer

A second cladding layer composition is formed over the patterned core and first cladding layer using the same composition and procedures used in forming the first cladding layer, except the thickness of the second cladding layer after the soft-bake is 10 µm. It is expected that cylindrical optical waveguides are thereby formed.

Example 19

Clad (1) Layer

A first cladding layer composition is formed by combining in admixture 66 wt % Propylene glycol monomethyl ether acetate, 12 wt % Isobutyl ester of styrene maleic anhydride, 10 wt % Pentaerythritol triacrylate, and 12 wt % trimethylolpropane triacrylate. An epoxy laminate, such as commonly used in printed wiring board manufacture is roller-coated with the composition and soft-baked in air for two minutes at 90° C., to a thickness of 7 µm. The composition is then exposed with 200 mJ/cm² actinic radiation and hard-baked in air for 60 minutes at 150° C.

Core

The first cladding layer is coated with a core layer and the core layer is patterned and reflowed using the composition and procedures described in Example 7.

Clad (2) Layer

A second cladding layer composition is formed over the patterned core and first cladding layer using the same composition and procedures used in forming the first cladding layer, except the thickness of the second cladding layer after the soft-bake is 10 µm. It is expected that cylindrical optical waveguides are thereby formed.

Example 20

Clad (1) Layer

A first cladding layer composition is formed by combining in admixture 50 wt % Propylene glycol monomethyl ether acetate, 30 wt % Novolac resin prepared from the condensation of meta cresol and formaldehyde under acid conditions, and 20 wt % of the reaction product of 2,1-diazonaphthylquinone-5-sulfonyl chloride and 2,3,4-trihydroxybenzophenone. A copper-clad epoxy laminate, such as commonly used in printed wiring board manufacture, is roller-coated with the composition to a thickness of 14 µm and soft-baked in air for two minutes at 90° C., to a thickness of 7 µm. The composition is exposed with 1000 mJ/cm² actinic radiation and then hard-baked in air for sixty minutes at 200° C.

Core

The first cladding layer is coated with a core layer and the core layer is patterned and reflowed using the composition and procedures described in Example 8.

Clad (2) Layer

A second cladding layer composition is formed over the patterned core and first cladding layer using the same composition and procedures used in forming the first cladding layer, except the thickness of the second cladding layer after the soft-bake is 10 µm. It is expected that cylindrical optical waveguides are thereby formed.

Example 21

Clad (1) Layer

A first cladding layer composition is formed by combining in admixture 40 wt % propylene glycol monomethyl ether acetate, 54.95 wt % of the condensation reaction product of 79 wt % phenyl-triethoxysilane, 19 wt % trifluoromethyl-triethoxysilane, and 2 wt % dimethyl-diethoxysilane, 5 wt % polydiphenylsiloxane, and 0.05 wt % Dow SILWET L-7604 silicone-base oil. The composition is spin-coated at 3000 rpm onto a six-inch silicon dioxide-coated silicon wafer and soft-baked in air on a hot plate for two minutes at 90° C., to a thickness of 7 µm. The composition is then hard-baked in air on a hot plate for ten minutes at 200° C.

Core

The first cladding layer is coated with a core layer and the core layer is patterned and reflowed using the composition and procedures described in Example 9.

Clad (2) Layer

A second cladding layer composition is formed over the patterned core and first cladding layer using the same composition and procedures used in forming the first cladding layer, except the thickness of the second cladding layer after the soft-bake is 10 µm. It is expected that cylindrical optical waveguides are thereby formed.

Example 22

Clad (1) Layer

A first cladding layer composition is formed by combining in admixture 47 wt % propylene glycol monomethyl ether acetate, 48.95 wt % of the condensation reaction product of 49 wt % phenyl-triethoxysilane, 49 wt % methyl-triethoxysilane, and 2 wt % dimethyl-diethoxysilane, 4 wt % polydiphenylsiloxane, and 0.05 wt % Dow SILWET L-7604 silicone-base oil. The composition is spin-coated at 3000 rpm onto a six-inch silicon dioxide-coated silicon wafer and soft-baked in air on a hot plate for two minutes at 90° C., to a thickness of 7 µm. The composition is then hard-baked in air on a hot plate for ten minutes at 200° C.

Core

The first cladding layer is coated with a core layer and the core layer is patterned and reflowed using the composition and procedures described in Example 10.

Clad (2) Layer

A second cladding layer composition is formed over the patterned core and first cladding layer using the same composition and procedures used in forming the first cladding layer, except the thickness of the second cladding layer after the soft-bake is 10 µm. It is expected that cylindrical optical waveguides are thereby formed.

Example 23

Clad (1) Layer

A first cladding layer composition is formed by combining in admixture 43 wt % propylene glycol monomethyl ether acetate, 42.95 wt % of the condensation reaction product of 65 wt % phenyl-triethoxysilane, 33 wt % methyl-triethoxysilane, and 2 wt % dimethyl-diethoxysilane, 10 wt % hexamethylol-methane-melamine, 4 wt % polydiethoxysiloxane, and 0.05 wt % Dow SILWET L-7604 silicone-base oil. The composition is spin-coated at 3000 rpm onto a six-inch silicon dioxide-coated silicon wafer and soft-baked in air on a hot plate for two minutes at 90° C., to a thickness of 7 μm. The composition is then hard-baked in air on a hot plate for ten minutes at 200° C.

Core

The first cladding layer is coated with a core layer and the core layer is patterned and reflowed using the composition and procedures described in Example 11.

Clad (2) Layer

A second cladding layer composition is formed over the patterned core and first cladding layer using the same composition and procedures used in forming the first cladding layer, except the thickness of the second cladding layer after the soft-bake is 10 μm. It is expected that cylindrical optical waveguides are thereby formed.

Example 24

Clad (1) Layer

A first cladding layer composition is formed by combining in admixture 50 wt % propylene glycol monomethyl ether acetate, 49.99 wt % phenyl-methyl silsesquioxane (20:80), and 0.01 wt % Dow SILWET L-7604 silicone-base oil. The composition is spin-coated at 2000 rpm onto a six-inch silicon dioxide-coated silicon wafer and soft-baked in air on a hot plate for two minutes at 90° C., to a thickness of 7 μm. The composition is then hard-baked in air on a hot plate for ten minutes at 200° C. An SOG etch stop layer is coated on the layer and is cured.

Core

The first cladding layer is coated with a core layer and the core layer is patterned and reflowed using the composition and procedures described in Example 12.

Clad (2) Layer

A second cladding layer composition is formed over the patterned core and first cladding layer using the same composition and procedures used in forming the first cladding layer, except the thickness of the second cladding layer after the soft-bake is 10 μm. It is expected that cylindrical optical waveguides are thereby formed.

While the invention has been described in detail with reference to specific embodiments thereof, it will be apparent to one skilled in the art that various changes and modifications can be made, and equivalents employed, without departing from the scope of the claims.

What is claimed is:

1. A method of forming an optical waveguide, comprising:
   (a) forming over a substrate a layer of a photodefinable composition comprising at least one material chosen from substituted or unsubstituted polyamides, polyimides, poly(meth)acrylates, polyurethanes, polycarbonates, epoxies, polysiloxanes, polysilsesquioxanes, norbornenes, silicates, and SOL-Gels;
   (b) exposing a portion of the layer to actinic radiation;
   (c) developing the exposed layer to form a waveguide core structure; and
   (d) heating the waveguide core structure to a temperature and for a time effective to reflow the structure such that it becomes at least partially rounded in cross-section.

2. The method of claim 1, wherein the surface of the substrate comprises a first cladding layer on which the layer of photodefinable composition is formed and a second cladding layer is deposited over the waveguide core structure and the first cladding layer.

3. An optical waveguide formed by the method of claim 2.

4. An electronic device, comprising one or more optical waveguide of claim 3.

5. The method of claim 2, wherein the core structure and the cladding layers comprise at least one material belonging to the same class of materials chosen from substituted or unsubstituted polyamides, polyimides, poly(meth)acrylates, polyurethanes, polycarbonates, epoxies, polysiloxanes, polysilsesquioxanes, norbornenes, silicates, and SOL-Gels.

6. The method of claim 1, wherein the photodefinable composition comprises a polymer comprising units of the formula $(RSiO_{1.5})$, wherein R is a substituted or unsubstituted organic side chain group.

7. The method of claim 6, wherein the photodefinable composition comprises a polymer comprising units of the formula $(R^1SiO_{1.5})$ and $(R^2SiO_{1.5})$, wherein $R^1$ and $R^2$ are different and are substituted or unsubstituted organic side chain groups.

8. The method of claim 7, wherein one of $R^1$ and $R^2$ is a substituted or unsubstituted aromatic group and the other of $R^1$ and $R^2$ is a substituted or unsubstituted aliphatic group.

9. The method of claim 1, further comprising prior to (a), forming a channel in the substrate, wherein the channel defines a lower portion of the core structure.

10. A method of forming an optical waveguide, comprising:
    (a) providing a substrate having on a surface thereof a cladding layer of a material having an index of refraction;
    (b) forming over a portion of the cladding layer a waveguide core structure comprising at least one material chosen from substituted or unsubstituted polyamides, polyimides, poly(meth)acrylates, polyurethanes, polycarbonates, epoxies, polysiloxanes, polysilsesquioxanes, norbornenes, silicates, and SOL-Gels, and silicon oxides, silicon nitrides, silicon oxynitrides, and doped glasses; and
    (c) heating the waveguide core structure to a temperature and for a time effective to reflow the structure such that it becomes at least partially rounded in cross-section, wherein the reflowed structure has an index of refraction greater than the index of refraction of the cladding layer.

11. An optical waveguide formed by the method of claim 10.

12. An electronic device, comprising one or more optical waveguide of claim 11.

13. The method of claim 10, wherein the waveguide core structure is formed by depositing a waveguide core layer over the cladding layer, forming an etching mask over a portion of the waveguide core layer, and etching exposed portions of the waveguide core layer.

14. The method of claim 10, wherein the waveguide core structure is formed by directly printing or embossing the structure on the substrate.

15. The method of claim 10, wherein the waveguide core structure is formed by: depositing a waveguide core layer of a photoimageable composition over the cladding layer, exposing the waveguide core layer to actinic radiation, and developing the waveguide core layer, wherein the remaining portion of the waveguide core layer forms the waveguide core structure.

16. The method of claim 10, further comprising forming a second cladding layer over the waveguide core structure and the other cladding layer.

17. The method of claim 10, further comprising prior to (b), forming a channel in the cladding layer, wherein the channel defines a lower portion of the core structure.

18. A method of forming an optical waveguide, comprising:
(a) providing a substrate having on a surface thereof a cladding layer of a material having a first index of refraction; and
(b) forming by printing over a portion of the cladding layer a waveguide core structure having a second index of refraction that is greater than the first index of refraction, wherein the waveguide core structure as printed is at least partially rounded in cross-section.

19. The method of claim 18, wherein the waveguide core is formed by ink jet printing.

20. The method of claim 18, wherein the waveguide core structure comprises a polymer comprising units of the formula ($R^1SiO_{1.5}$) and ($R^2SiO_{1.5}$), wherein $R^1$ and $R^2$ are different and are substituted or unsubstituted organic side chain groups.

* * * * *